J. G. HIGGINS.
INSECT TRAP.
APPLICATION FILED FEB. 7, 1917.
1,249,753.
Patented Dec. 11, 1917.
2 SHEETS—SHEET 1.
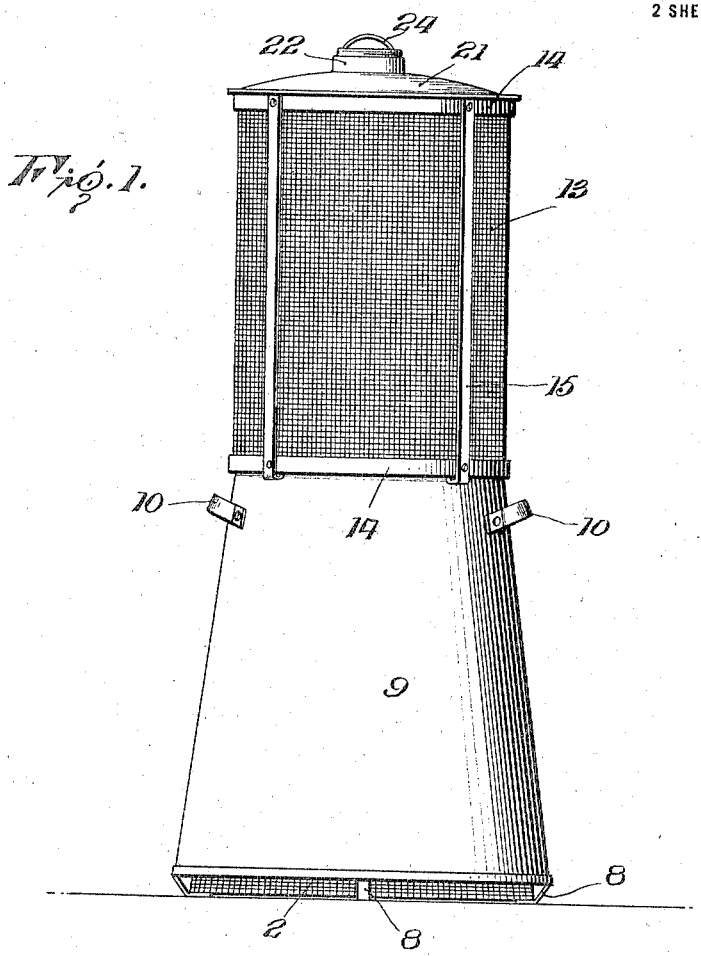
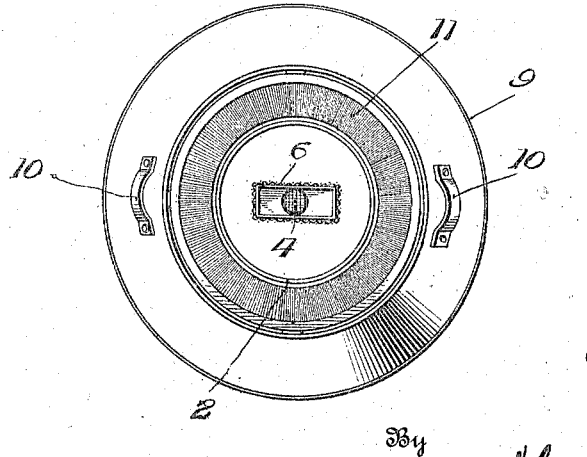
Inventor
J. G. Higgins.
By
_____, Attorneys.

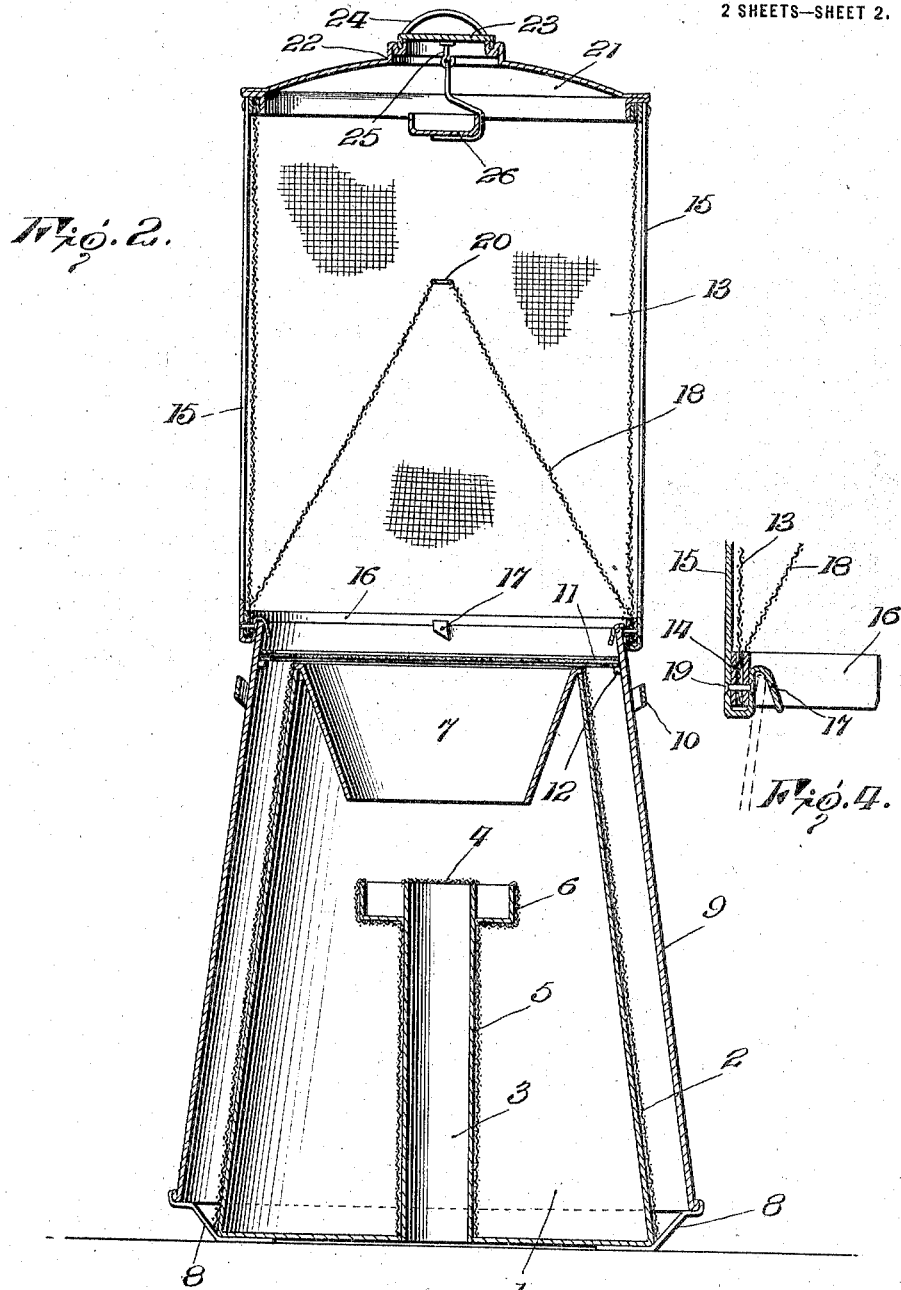

UNITED STATES PATENT OFFICE.

JOHN G. HIGGINS, OF CHATTANOOGA, TENNESSEE.

INSECT-TRAP.

1,249,753.

Specification of Letters Patent.

Patented Dec. 11, 1917.

Application filed February 7, 1917. Serial No. 147,184.

*To all whom it may concern:*

Be it known that I, JOHN G. HIGGINS, a citizen of the United States, residing at Chattanooga, in the county of Hamilton and State of Tennessee, have invented certain new and useful Improvements in Insect-Traps, of which the following is a specification.

This invention relates to insect traps and is intended more particularly for catching and destroying flies and roaches. One object of the invention is to provide a device by which the insects will be attracted and which will be so constructed that ingress of the insects will be facilitated while egress will be prevented. A further object of the invention is to provide a device for the stated purpose which will be so constructed that its parts may be readily separated so as to facilitate cleaning, and removal of the catch. A further object of the invention is to provide a device for the stated purpose which will be attractive in appearance and can be produced at a very low cost.

The several stated objects of the invention and other incidental objects which will appear in the course of the following description, are attained in such a device as is illustrated in the accompanying drawings, and the invention resides in certain novel features which will be particularly pointed out in the claims.

In the drawings:

Figure 1 is an elevation of a trap embodying my invention.

Fig. 2 is an enlarged vertical section.

Fig. 3 is a plan view of the lower portion of the trap.

Fig. 4 is an enlarged detail view of the rest or bracket by which the upper portion of the trap is supported on the lower portion thereof.

In carrying out my invention, I employ a base or supporting member 1 which is preferably a hollow circular body of less diameter at its upper end than at its lower end and covered by wire netting or similar material, as shown at 2, the said netting furnishing a rough surface up which the insects may readily crawl so that their entrance into the trap will be facilitated. In the center of this holder, a post 3 rises from the bottom thereof and said post may be of tubular or other construction, as may be preferred, the tubular construction being desirable for the reason that it may be rolled out of sheet metal and soldered or otherwise secured to the bottom of the holder, as will be readily understood. A guard 4 of wire netting or similar material is secured across the upper end of this post to prevent the insects from getting out, and the outer surface of the post is covered with similar material, as shown at 5, to provide means whereby the insects may crawl up the post in an effort to reach poison placed in the bait box 6, secured upon and around the upper end of the post. In the upper end of the holder 1, I secure an inverted conical rim or ring 7, which will preferably be of sheet metal so as to provide a smooth polished surface over which the insects may slide, but upon which it will be difficult to crawl. This rim will extend inwardly and downwardly from the upper edge of the holder and will consequently act as a guard to prevent egress of the insects from the holder.

At the base of the holder, I secure brackets 8 which project upwardly and outwardly from the base and upon which a shell 9 rests. This shell is similar in form to the holder 1 but is of larger diameter so that it surrounds the shell in spaced relation thereto, whereby a passage is provided to direct the insects to the upper end of the holder. The brackets 8 are in spaced relation to each other and support the lower end of the shell in spaced relation to the holder so that an entrance for the insects is provided at the lower end of the trap. The inclosing shell 9 is provided externally with handles 10 whereby the trap may be moved from place to place, and upon the inner side of the shell immediately adjacent the upper end of the holder is a barrier 11 which is preferably in the form of an annular brush having its bristles extending toward its center. This brush may be supported upon lugs 12 provided on the inner side of the shell 9, and is so positioned that its bristles will yield readily to the upward passage or entrance of the insects, but an attempt of the insects to pass outwardly will bring them against the ends of the bristles so that their escape will be checked and prevented. The barrier may conveniently, as stated, be in the form of a brush, but any construction which will provide a plurality or annular series of flexible points to project toward the upper edge of the holder and immediately adjacent the same will suffice.

Upon the upper end of the shell 9 is supported a reticulated cylinder 13 which is provided with rims or reinforcing rings 14 at its upper and lower ends, said rings being connected by brace bars or standards 15 secured to and extending between the same. The lower ends of the brace bars 15 are carried under the lower ring or rim 14 and an inner rim or ring 16 disposed concentric therewith, and are doubled on themselves to provide hooks 17 which engage over the upper edge or the upper end of the shell 9, as clearly shown, to support the cylinder 13 upon the shell. The bends or curves of the hooks 17 are so proportioned that the ring or rim 16 will be in spaced relation to the upper end of the shell 9 and a space will be thereby provided to permit the entrance of the insets into the trap. A reticulated cone 18 is disposed within the lower end of the cylinder 13 and the lower edge of this cone is fitted between the rims 14 and 16 and secured thereby, all the parts being fastened together by rivets or similar devices 19 as will be readily understood. The upper end of the reticulated cone 18 is open, as shown at 20, so that while the insects may pass up the cone and through the upper end thereof, they will be prevented from escaping and will be caught between the cone and the cylinder. The upper end of this cylinder is closed by a removable cover 21, of proper form and dimensions, and at the center of this cover is a rim 22 in which is fitted a cap or closure 23 provided with a handle 24 and having a hook 25 depending from its inner side. A bait box or basket 26 is suspended from the said hook and poison is placed in this bait box, as will be readily understood.

It is thought the use and advantages of my improved device will be apparent from the foregoing description, taken in connection with the accompanying drawings. Poisonous insect food is placed in the bait boxes 6 and 26 and the trap set at an infested point. The odor from the bait of poisonous food will attract the insects which will enter between the holder 1 and the shell 9 and between the said shell and the cylinder 13. The insects will pass over the upper edge of the holder 1 and will thereupon drop down into said holder and will be prevented from escaping as the inner smooth surfaces of the holder and the guard 7 will resist their efforts to escape by crawling. They may, however, crawl up the rough surface of the central post and reach the bait box, where, of course, the poison will kill them. Such of the insects as pass into the upper member of the trap will be confined therein and may eventually reach the bait box 26 and the poison will, of course, kill them. It will be readily noted that my trap is very simple in the construction and arrangement of its parts, and may be manufactured at a very low cost. The cap 23 and the cover or lid 21 may be easily and quickly removed to renew the poison or to clean the trap or to destroy the accumulated insects. The upper trap can be easily lifted from the lower member and the guard 7 is detachable so that it may be easily removed to permit the trap to be cleaned or the catch to be destroyed.

Having thus described the invention, what is claimed as new is—

1. An insect trap comprising a holder having an open upper end, an open-ended shell inclosing and supported from the holder and disposed in spaced relation thereto, an inverted conical rim secured within the open upper end of the holder, a support on the inner wall of the shell near the upper end thereof, a brush resting on said support and extending across the space between the same and the upper end of the holder, a post rising from the base of the holder, and a bait support secured on and around the upper end of the said post below the inverted conical rim.

2. An insect trap comprising a holder having an open upper end, brackets projecting outwardly and upwardly from the base of the holder, an open-ended shell resting on and supported by said brackets whereby to inclose the holder in spaced relation thereto, and a flexible barrier on the inner surface of the shell immediately adjacent and projecting to the upper end of the holder.

In testimony whereof I affix my signature.

JOHN G. HIGGINS. [L. s.]

Copies of this patent may be obtained for five cents each, by addressing the "Commissioner of Patents, Washington, D. C."